US011065782B2

(12) United States Patent
Gardiner et al.

(10) Patent No.: US 11,065,782 B2
(45) Date of Patent: Jul. 20, 2021

(54) METHOD FOR CASTING A CONSTRUCTION ELEMENT

(71) Applicant: Laing O'Rourke Australia Pty Limited, North Sydney (AU)

(72) Inventors: James Bruce Gardiner, Chippendale (AU); Steven Robert Janssen, Chippendale (AU)

(73) Assignee: LAING O'ROURKE AUSTRALIA PTY LIMITED, North Sydney (AU)

( * ) Notice: Subject to any disclaimer, the term of this patent is extended or adjusted under 35 U.S.C. 154(b) by 510 days.

(21) Appl. No.: 14/769,151

(22) PCT Filed: Feb. 21, 2014

(86) PCT No.: PCT/AU2014/000160
§ 371 (c)(1),
(2) Date: Aug. 20, 2015

(87) PCT Pub. No.: WO2014/127426
PCT Pub. Date: Aug. 28, 2014

(65) Prior Publication Data
US 2016/0001461 A1    Jan. 7, 2016

(30) Foreign Application Priority Data

Feb. 21, 2013 (AU) .............................. 2013900587
May 27, 2013 (AU) .............................. 2013901886
Feb. 5, 2014 (AU) .............................. 2014900338

(51) Int. Cl.
*B28B 7/34* (2006.01)
*E04G 21/04* (2006.01)
(Continued)

(52) U.S. Cl.
CPC ............... *B28B 7/346* (2013.01); *B25J 11/00* (2013.01); *B28B 1/14* (2013.01); *B28B 7/342* (2013.01);
(Continued)

(58) Field of Classification Search
CPC ......... B28B 7/342; B28B 7/346; B28B 7/344; B28B 7/34; B28B 7/348; B28B 1/008; B32B 13/12; E04G 21/0463
See application file for complete search history.

(56) References Cited

U.S. PATENT DOCUMENTS 1,668,723 A * 5/1928 Johnson ................... B28B 7/362
264/139
2,562,477 A * 7/1951 Ramsay ................ C04B 32/005
264/600

(Continued)

FOREIGN PATENT DOCUMENTS

AT          502110 A1      1/2007
CN       101213070 A       7/2008
(Continued)

OTHER PUBLICATIONS

Extended European Search Report and Written Opinion dated Mar. 16, 2017 for related EP Application No. 14753842.5, 10 pgs.
(Continued)

*Primary Examiner* — Matthew J Daniels
*Assistant Examiner* — Andrew D Graham
(74) *Attorney, Agent, or Firm* — Marshall, Gerstein & Borun LLP

(57) ABSTRACT

The present invention relates to a method for casting building material to form a construction element using a computer-controlled apparatus. The method comprises the steps of: moving the material deposition head and selectively depositing material, to fabricate a formwork; pouring build-
(Continued)

ing material in contact with at least a portion of the formwork; at least partially curing the building material, thereby forming the construction element; and removing at least a portion of the formwork from the construction element.

11 Claims, 20 Drawing Sheets

(51) Int. Cl.
| | |
|---|---|
| B28B 7/36 | (2006.01) |
| B28B 23/02 | (2006.01) |
| B25J 11/00 | (2006.01) |
| B29C 64/118 | (2017.01) |
| B28B 1/14 | (2006.01) |
| E04G 11/00 | (2006.01) |
| E04B 1/35 | (2006.01) |
| F24D 3/14 | (2006.01) |
| B33Y 10/00 | (2015.01) |
| B33Y 80/00 | (2015.01) |

(52) U.S. Cl.
CPC .......... *B28B 7/362* (2013.01); *B28B 23/022* (2013.01); *B29C 64/118* (2017.08); *E04G 11/00* (2013.01); *E04G 21/0463* (2013.01); *B33Y 10/00* (2014.12); *B33Y 80/00* (2014.12); *E04B 1/3505* (2013.01); *F24D 3/14* (2013.01); *Y02B 30/00* (2013.01)

(56) References Cited

U.S. PATENT DOCUMENTS

| | | | | |
|---|---|---|---|---|
| 2,629,135 | A * | 2/1953 | Johnson | B28B 7/0073 264/426 |
| 3,510,547 | A * | 5/1970 | Eisler | H05B 3/06 264/33 |
| 3,848,040 | A * | 11/1974 | Confer et al. | B28B 1/261 264/86 |
| 4,031,684 | A * | 6/1977 | Shibata | B28B 7/007 52/612 |
| 4,678,157 | A | 7/1987 | Fondiller | |
| 4,859,640 | A * | 8/1989 | Newkirk | C04B 35/652 501/128 |
| 4,865,783 | A * | 9/1989 | Ahonen | B28B 7/346 264/37.3 |
| 4,957,272 | A * | 9/1990 | Lee | E04G 17/14 249/196 |
| 5,014,480 | A * | 5/1991 | Guarriello | B28B 7/348 52/309.12 |
| 5,212,124 | A * | 5/1993 | Newkirk | B28B 7/342 501/134 |
| 5,213,746 | A * | 5/1993 | Tarwater | B28B 7/342 264/221 |
| 5,590,454 | A * | 1/1997 | Richardson | B29C 64/188 29/527.4 |
| 5,855,836 | A * | 1/1999 | Leyden | B29C 64/112 264/401 |
| 6,047,580 | A * | 4/2000 | Fritz | B21D 22/00 72/379.2 |
| 6,113,696 | A | 9/2000 | Tseng | |
| 6,117,521 | A * | 9/2000 | Yoshida | E04G 9/05 249/33 |
| 6,162,310 | A * | 12/2000 | Tseng | B22F 3/1112 156/155 |
| 6,375,880 | B1 * | 4/2002 | Cooper | B33Y 10/00 264/138 |
| 6,620,487 | B1 * | 9/2003 | Tonyan | C04B 28/18 428/192 |
| 6,936,212 | B1 * | 8/2005 | Crawford | B33Y 10/00 264/308 |
| 8,333,360 | B2 * | 12/2012 | Rule | C08G 61/08 249/187.1 |
| 2001/0003234 | A1 * | 6/2001 | Van Doren | E04C 3/20 52/251 |
| 2002/0037232 | A1 * | 3/2002 | Billiet | B22F 5/007 419/37 |
| 2002/0173575 | A1 * | 11/2002 | Artz | B28B 7/46 524/451 |
| 2003/0083771 | A1 * | 5/2003 | Schmidt | B33Y 10/00 700/119 |
| 2004/0156478 | A1 * | 8/2004 | Appleby | B23P 15/246 378/147 |
| 2004/0187714 | A1 | 9/2004 | Napadensky et al. | |
| 2004/0237439 | A1 * | 12/2004 | Powell | E04B 1/34823 52/505 |
| 2005/0003189 | A1 | 1/2005 | Bredt et al. | |
| 2006/0003095 | A1 | 1/2006 | Bullen et al. | |
| 2006/0019041 | A1 * | 1/2006 | Good-Kruger | B28B 7/346 428/15 |
| 2007/0138678 | A1 * | 6/2007 | Khoshnevis | B29C 48/14 264/34 |
| 2007/0164484 | A1 * | 7/2007 | Piccolo | B28B 7/362 264/333 |
| 2008/0092775 | A1 * | 4/2008 | Strauss | B28B 7/346 106/38.35 |
| 2008/0104906 | A1 * | 5/2008 | Pyo | E04C 1/397 52/223.7 |
| 2008/0187711 | A1 * | 8/2008 | Alam | B28B 1/001 428/114 |
| 2009/0004430 | A1 * | 1/2009 | Cummins | F42D 5/045 428/113 |
| 2009/0224438 | A1 | 9/2009 | Stampfi et al. | |
| 2010/0117248 | A1 * | 5/2010 | Christiansen | E04G 9/02 264/31 |
| 2010/0229714 | A1 * | 9/2010 | Tonyan | B32B 5/024 89/36.02 |
| 2010/0230035 | A1 * | 9/2010 | Frank | B28B 19/0015 156/153 |
| 2011/0244181 | A1 * | 10/2011 | Cangiano | E04B 2/02 428/138 |
| 2012/0260591 | A1 * | 10/2012 | Holscher | B28B 11/04 52/294 |
| 2014/0147634 | A1 * | 5/2014 | Dale | E04G 9/10 428/156 |
| 2014/0231617 | A1 * | 8/2014 | Wang | B28B 7/02 249/205 |
| 2014/0263942 | A1 * | 9/2014 | Ciuperca | E04G 11/12 249/78 |
| 2017/0254084 | A1 * | 9/2017 | Rapperstorfer | B28B 23/028 |

FOREIGN PATENT DOCUMENTS

| | | |
|---|---|---|
| DE | 102011011577 A1 | 4/2012 |
| ES | 2317543 T3 | 4/2009 |
| JP | 747527 A | 2/1995 |
| JP | 2001105420 A | 4/2001 |
| JP | 2008161898 A | 7/2008 |
| JP | 2008544879 A | 12/2008 |
| WO | 2007002965 A1 | 1/2007 |

OTHER PUBLICATIONS

First Examination Report dated Apr. 21, 2017 for related New Zealand Application No. 712447, 6 pgs.
"Introduction to 3d printing"—up.nic.in/knowdesk/3D-Printing-Technology.pdf, cited in NZ Exam Report dated Apr. 21, 2017 and believed to be available more than one year prior to the filing date of the instant application, 5 pgs.
"Polyethylene Glycol"—https://en.wikipedia.org/wiki/Polyethylene_glycol, cited in NZ Exam Report dated Apr. 21, 2017 and believed to be available more than one year prior to the filing date of the instant application, 9 pgs.
"Use of Water Reducers, Retarders, and Superplasticizers"—http://www.engr.psu.edu/ce/courses/ce584/concrete/library/materials/Admixture/AdmixturesMain.htm, obtained from and available for viewing at http://www.engr.psu.edu/ce/courses/ce584/concrete/library/materials/Admixture/AdmixturesMain.htm, cited in NZ Exam Report

(56) References Cited

OTHER PUBLICATIONS dated Apr. 21, 2017 and believed to be available more than one year prior to the filing date of the instant application, 6 pgs.
"TRiBOT 3-in-1 3D Print, CNC Mill, Injection Mould Machine"—https://www.youtube.com/watch?v=PhtC-mwGe0I, obtained from and available for viewing at https://www.youtube.com/watch?v=PhtC-mwGe0I, published Sep. 15, 2014, 3 pgs.
"Plastic injection moulding 101: Water Basics"—http://www.htiplastic.com/plastic-injectionmolding-101-water-basics, obtained from and available for viewing at http://www.htiplastic.com/plastic-injectionmolding-101-water-basics, published Apr. 4, 2012, 4 pgs.
"Reinforced concrete"—https://en.wikipedia.org/wiki/Reinforced_concrete, obtained from and available for viewing at https://en.wikipedia.org/wiki/Reinforced_concrete, cited in NZ Exam Report dated Apr. 21, 2017 and believed to be available more than one year prior to the filing date of the instant application, 7 pgs.
"CNC tape layer"—https://www.youtube.com/watch?v=ehfCEz_OfDU, obtained from and available for viewing at https://www.youtube.com/watch?v=ehfCEz_OfDU, published Dec. 1, 2011, 2 pgs.
International Search Report dated Jun. 18, 2014 for Intl. App. No. PCT/AU2014/000160, from which the instant application is based, 4 pgs.
International Preliminimary Report on Patentability dated Jan. 21, 2015 for Intl. App. No. PCT/AU2014/000160, from which the instant application is based, 23 pgs.

\* cited by examiner

METHOD FOR CASTING A CONSTRUCTION ELEMENT

RELATED APPLICATIONS

This application is a 35 U.S.C. 371 national stage filing from International Application No. PCT/AU2014/000160, filed Feb. 21, 2014, and claims priority to Australian Provisional Patent Applications Nos. 2014900338, filed Feb. 5, 2014; 2013901886, filed May 27, 2013; and 2013900587, filed Feb. 21, 2013, the teachings of which are incorporated herein by reference.

TECHNICAL FIELD

The present invention generally relates to casting settable building materials to form construction elements used to construct buildings or similar structures. In particular, the invention relates to casting building materials to form construction elements using a mould (formwork).

BACKGROUND TO THE INVENTION

Casting of settable building materials, such as concrete, to form elements which are used to construct buildings, or which form an integral part of a building, has been performed for a considerable length of time. Casting these materials typically involves constructing a mould, commonly known as formwork, having a cavity with inverse geometry to the desired geometry of a construction element. Substantially liquid building material is poured into the cavity and set (cured), solidifying the building material within the cavity and forming a construction element having the desired geometry. The mould is then removed from the construction element.

One advantage of casting construction elements is the scope for creating complex construction element geometries, allowing elements to be cast having specific functional or aesthetic properties. For example, as a settable building material changes state from a liquid to a solid, the material may be poured into a mould having an amorphous, complex shape and cured, following which the solidified part has a substantially corresponding amorphous, complex shape, which would be difficult to create using other processes.

As architecture and engineering has become more sophisticated, the need for cast, non-standard 'freeform' geometry construction elements has increased. One issue common to many non-standard geometry structures is the presence of 'undercut' or over-hanging surfaces. If a construction element is cast having such surfaces using a conventional, rigid formwork, when the building material solidifies the formwork is engaged with the construction element, proving difficult or impossible to remove the formwork from the construction element.

Past solutions to overcome this issue have involved the use of a complex, multi-part formwork, which may be disassembled to release the construction element from the formwork, or a consumable formwork which is destroyed after the construction element solidifies to release the element, for example, by breaking the formwork apart. However, these solutions are often expensive due to the complexity of the multi-part formwork and/or the quantity of formwork material consumed during each casting process, which can create large volumes of waste formwork material, and also can require a considerable length of time and/or energy to remove the formwork from the cast element.

Accordingly, it would be useful to provide a more efficient, sustainable and cost effective method for casting building material to form a construction element, and particularly for casting a construction element which has complex geometry, such as over-hanging surfaces.

SUMMARY OF THE INVENTION

According to one aspect of the invention, there is provided a method for casting building material to form a construction element using a computer-controlled apparatus, the apparatus having a material deposition head in communication with a reservoir of formwork material and being movable within a build volume responsive to computer instructions, the method comprising the steps of: receiving, by the apparatus, computer instructions relating to a formwork geometry; moving the material deposition head within the build volume and selectively depositing formwork material in specific locations, to fabricate a formwork corresponding with the formwork geometry; pouring building material in contact with at least a portion of the formwork; at least partially curing the building material in contact with the formwork, thereby forming the construction element; and removing at least a portion of the formwork from the construction element.

Referring to another aspect of the invention, there is provided a method for casting building material to form a construction element using a computer-controlled apparatus, the apparatus having a material deposition head in communication with a reservoir of formwork material and being movable within a build volume responsive to computer instructions, the method comprising the steps of: receiving, by the apparatus, computer instructions relating to a first formwork geometry; moving the material deposition head within the build volume and selectively depositing formwork material in specific locations, to fabricate a first formwork corresponding with the formwork geometry; selectively applying one or more portions of composite material to the first formwork, in specific locations, to form a homogenous layer of composite material; curing the layer of composite material to form a composite element; removing the first formwork from the composite element; pouring a first building material in contact with at least a portion of the composite element; and curing the first building material in contact with the composite element, thereby forming a first construction element.

In an alternative aspect of the invention, there is provided a method for casting building material to form a construction element using a computer-controlled apparatus, the apparatus having a material deposition head in communication with a reservoir of formwork material and being movable within a build volume responsive to computer instructions, the method comprising the steps of: receiving, by the apparatus, computer instructions relating to a first formwork geometry; moving the material deposition head within the build volume and selectively depositing formwork material in specific locations, to fabricate a first formwork corresponding with the first formwork geometry; selectively applying one or more portions of composite material to the first formwork, in specific locations; curing the one or more portions of composite material to form one or more first composite elements; receiving, by the apparatus, computer instructions relating to a second formwork geometry; moving the material deposition head within the build volume and selectively depositing formwork material in specific locations, to fabricate a second formwork corresponding with the second formwork geometry, the second formwork at least partially in contact with the first formwork or the one or more first composite elements; selectively applying one or more portions of composite material to the second formwork, in specific locations; curing the one or more portions of composite material to form one or more second composite elements; pouring building material in contact with at least a portion of the first and second formworks; curing the building material in contact with the first and second formworks, thereby forming a construction element; and removing the first and second formworks from the construction element.

In the context of this specification, 'construction element' refers generally to any object used in conjunction with other elements to construct a structure and in particular, refers to elements used to construct buildings, bridges and similar structures, such as artificial reefs, pipes or water treatment plants. Construction elements which are attached to a larger structure, or which form an entire, discrete structure, are considered within the scope of 'construction element'.

Throughout this specification the term 'formwork' refers generally to an article used to shape the structure of another material during the transition of that material from a fluid or a flexible matrix, to a substantially rigid structure. Such 'formworks' include a mould, buck, core or mandrel.

For the purposes of this specification, 'composite material' or 'composite' refers generally to fibre-reinforced polymer composite materials, including thermoplastic composites, short fibre thermoplastics, long fibre thermoplastics and long fibre-reinforced thermoplastics. The composite material may include fibres formed from natural (organic) or synthetic (non-organic) materials. In particular, this specification will make reference to carbon-fibre or glass-fibre cloth, mat or tape and fibre pre-impregnated (known as 'pre-preg') tape. However, the term composite may also include reference to metal matrix or ceramic matrix composite materials.

BRIEF DESCRIPTION OF THE DRAWINGS

Preferred embodiments of the invention will now be described, by way of example only, with reference to the accompanying drawings in which.

DETAILED DESCRIPTION OF PREFERRED EMBODIMENTS

The present disclosure generally relates to a method for casting a settable building material, such as concrete, to form a construction element using a mould (formwork) fabricated by a computer-controlled apparatus responsive to computer instructions relating to the formwork geometry. In particular, the disclosure relates to a method for casting building material to form a construction element using at least one meltable or dissolvable formwork fabricated by the apparatus, where the at least one formwork is melted or dissolved to remove the formwork from the cured construction element, and the formwork material may be recycled to the computer-controlled apparatus for re-use. Furthermore, the disclosure relates to a method for casting building material to form a construction element using a formwork fabricated by the computer-controlled apparatus, where composite material and/or a surface treatment, configured to affect the construction element, is selectively applied to the formwork and transferred to, or integrated with, the construction element during the casting process.

Figure 1A:
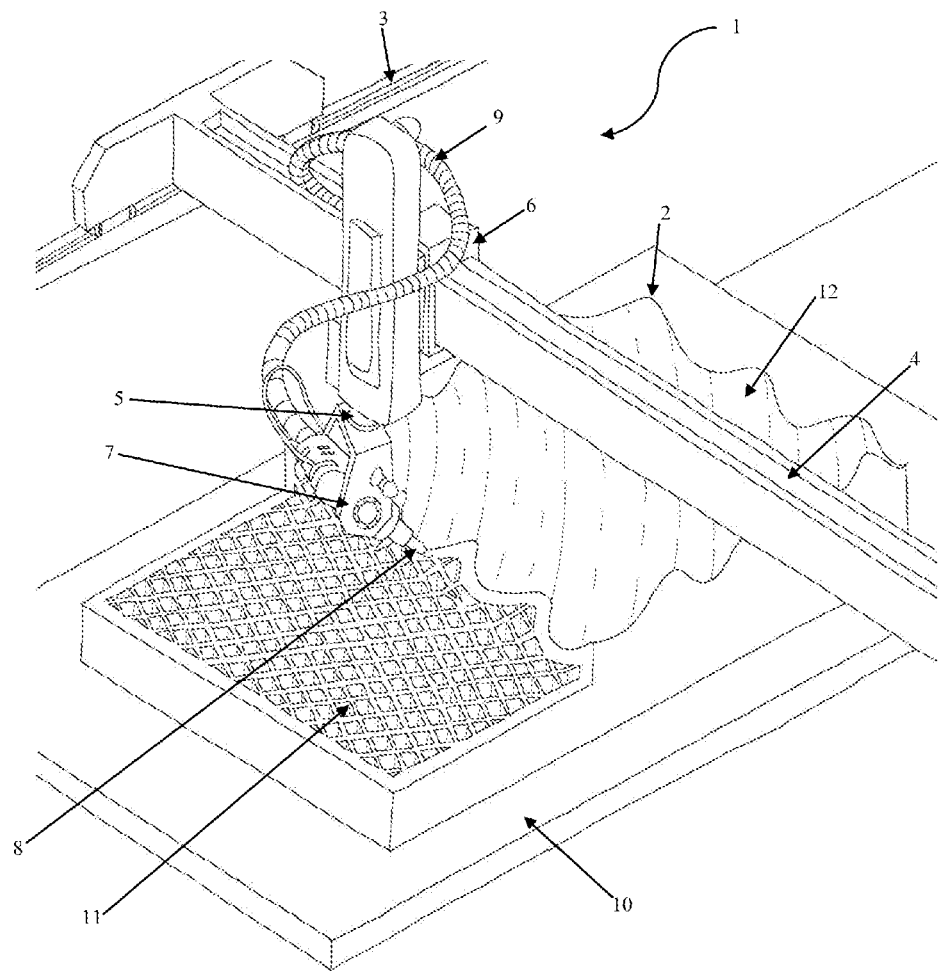
FIG. 1A is a perspective view of an apparatus depositing material to create a formwork.

In FIG. 1A, an apparatus 1 is shown depositing material to fabricate a formwork 2. The apparatus 1 comprises a first gantry 3 and a second gantry 4, arranged perpendicular to one another and movable in relation to each other, and an extendable arm 5 connected to a carriage 6 movable along the second gantry 4. A material deposition head 7 is rotatably connected to an end of the arm 5 around at least two axes. The material deposition head 7 has one or more deposition nozzles 8 in communication with a formwork material reservoir (not illustrated) of substantially liquid formwork material, via a hose 9. The gantries 3, 4, carriage 6 and arm 5 cooperate to move the material deposition head 7 within a build volume, being a defined volume adjacent to the apparatus 1, in this case below the gantries 3, 4. In order to allow 'construction scale' formwork to be fabricated, i.e. formwork that is sufficiently dimensioned to allow casting of large construction elements for buildings, the build volume is typically greater than 1 $m^3$.

The apparatus 1 moves the material deposition head 7 within the build volume responsive to computer instructions relating to a formwork geometry and selectively deposits portions of formwork material in specific locations to fabricate the formwork 2, which corresponds with the formwork geometry. The computer instructions relating to the formwork geometry are dependent on a digital three-dimensional (3D) model of the construction element or formwork created within computer aided design (CAD) software. The 3D model of the construction element of formwork is created by a user operating the CAD software and/or by an algorithm executed by the CAD software. Generally, the CAD data is derived as a result of a user modelling the construction element geometry (known as a digital 'buck') within a virtual environment in the CAD software, and the CAD software calculating a digital 'mould' geometry, being the inverse geometry of the buck which provides the mould (formwork) geometry necessary to cast the construction element. The apparatus 1 is then provided with computer instructions relating to the digital mould, directing the apparatus to fabricate the formwork 2.

Optionally, the apparatus 1 includes a 3D scanner (not shown), such as a near field sonar or infrared scanner, configured to scan the geometry of the formwork 2 and verify the geometry with the 3D model at predefined intervals during the fabrication process. When the 3D scanner detects variation from the 3D model beyond a predefined tolerance, computer instructions are executed by the apparatus 1 to adjust the geometry of the formwork 2 being fabricated to within the defined tolerance. For example, this may involve adding or removing formwork material from the formwork 2 by the apparatus 1.

Formwork material is typically deposited by the apparatus 1 in successive, substantially horizontal planar layers, with a first layer being deposited on a substrate 10 and each subsequent layer deposited at least partially in contact with the previously deposited layer. The formwork material may also be deposited on a variable plane or in non-planar layers, for example, in continuous curves forming self-supporting beads of formwork material.

In scenarios when the apparatus 1 deposits successive layers of formwork material to fabricate the formwork 2, the thickness of the layers are typically in the region of 0.05-1 cm, to optimise the resolution of the formwork. In some instances, the layers of material may be thicker than this, for example, where minimising the time required to fabricate a large formwork is a priority, resulting in 'steps' being created between layers, or other imperfections being formed on the formwork. In such instances, the 'steps' or surface imperfections are removed by a milling (finishing) operation. This is typically performed by the apparatus 1 operating a milling head (not shown), responsive to the computer instructions, to selectively remove portions of formwork material from the formwork.

The formwork material is supplied to the apparatus 1 from the reservoir (not shown) in a substantially liquid state, having sufficient viscosity to flow through the hose 9 to the nozzle 8. The formwork material composition may include viscosity adjusting agents to optimise the viscosity of the formwork material and aid flow rate. The formwork material is preferably heated before being deposited from the nozzle 8 to a temperature just above the melting point of the material, preferably within a range of 0-10° C. above the melting point. Shortly after deposition, the formwork material rapidly cools and hardens, at least partially solidifying. The formwork material is configured to form a coherent bond with adjacent portions of previously deposited formwork material shortly after being deposited.

Preferably, the formwork material is meltable, such as a wax compound, able to be melted at a relatively low temperature, collected and recirculated to the reservoir, with minimal processing required before being reused by the apparatus 1. The formwork material is preferably configured to melt at a temperature of less than 70° C. to ensure that when heating the formwork 2 and a cast, concrete construction element engaged with the formwork 2, that the heat does not significantly affect the structure of the concrete construction element whilst curing, which could reduce the strength of the construction element.

Alternatively, the formwork material is soluble, such as plaster, able to be dissolved and optionally, collected and recirculated to the reservoir. Similarly, the formwork material may be dissolvable, such as foam, with a chemical solution. The formwork 2 is dissolved after curing the construction element by spraying the formwork 2 with a liquid, such as a chemical solution, or by at least partially submerging the formwork 2 and the construction element in a liquid, thereby dissolving the formwork material and removing the formwork from the cast construction element.

Referring to FIG. 1A, the formwork 2 is shown partially fabricated, having an internal scaffold structure 11 configured as a lattice, enclosed by a casting surface 12. The casting surface 12 forms a continuous shell around the scaffold structure 11, which building material is ultimately poured over and set, thereby forming the geometry of a construction element. The formwork 2 is fabricated by the apparatus 1 as a hollow structure having an internal scaffold 11 to minimise time and formwork material required to fabricate the formwork 2, and also minimise time and energy required to melt the formwork 2 when removing the formwork 2 from a cast construction element. The scaffold structure 11 may be formed from a consistent, tessellated pattern (as shown in FIG. 1A) or a non-regular structure of interconnected braces. The geometry of the scaffold structure 11 is optimised according to the functional requirements of the formwork 2 and associated construction element cast in contact with the formwork 2. For example, the density of the scaffold structure 11 may be varied throughout the internal volume of the formwork 2 according to the weight/density of a construction element it supports during casting. Alternatively, the scaffold structure 11 may form one or more conduits to allow the passage of a fluid through the formwork 2, to cool the formwork 2 during the fabrication process.

In FIG. 1A, the formwork 2 has sealed side-walls extending between the substrate 10 and the casting surface 12. Alternatively, at least portions of some of the side-walls are absent to allow liquid or gas to pass through the scaffold structure 11 to rapidly cool and harden the formwork 2, or heat the formwork 2 to reduce shrinkage. Similarly, some or all of the build volume is selectively temperature controlled to affect the temperature of the formwork 2 and/or a construction element. The material deposition head 7 may also comprise an additional jet (not shown) for selectively expelling heated or cooled liquid/gas to affect the temperature of the formwork 2 and, when heating, selectively melt the formwork 2 to refine the surfaces of the formwork 2.

Figure 1B:
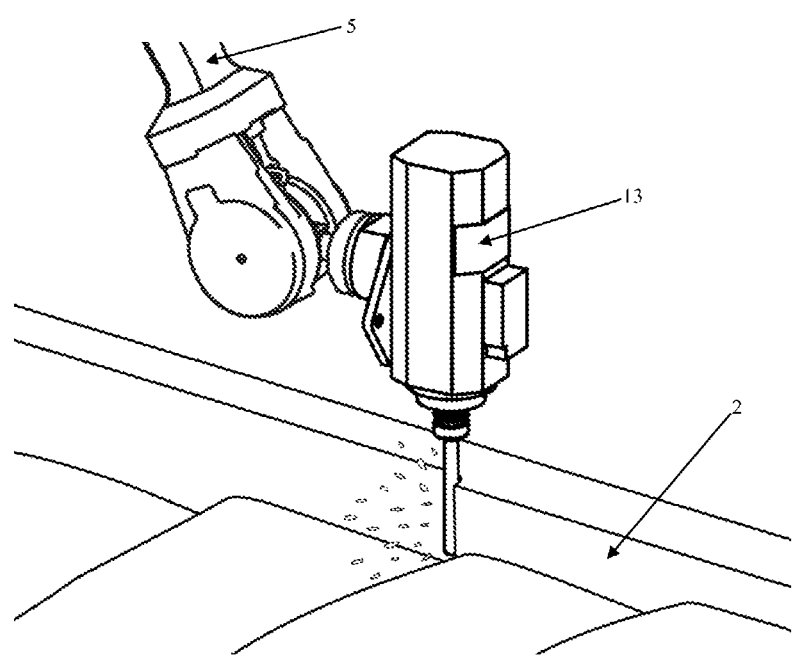
FIG. 1B is a perspective view of a computer-controlled milling spindle.

In FIG. 1B, the apparatus 1 is connected to a milling spindle 13 attached to the arm 5. The apparatus 1 interchanges the material deposition head 7 with the milling spindle 13, responsive to computer instructions, and selectively mills the formwork 2 and remove formwork material in specific locations. The milling spindle 13 may include one or more air inlets (not shown) in connection with an air extraction (vacuum) system, to draw air proximal to the milling spindle 13 into the inlets and collect particles of formwork material, as the material is removed by the milling spindle 13.

Figure 1C:
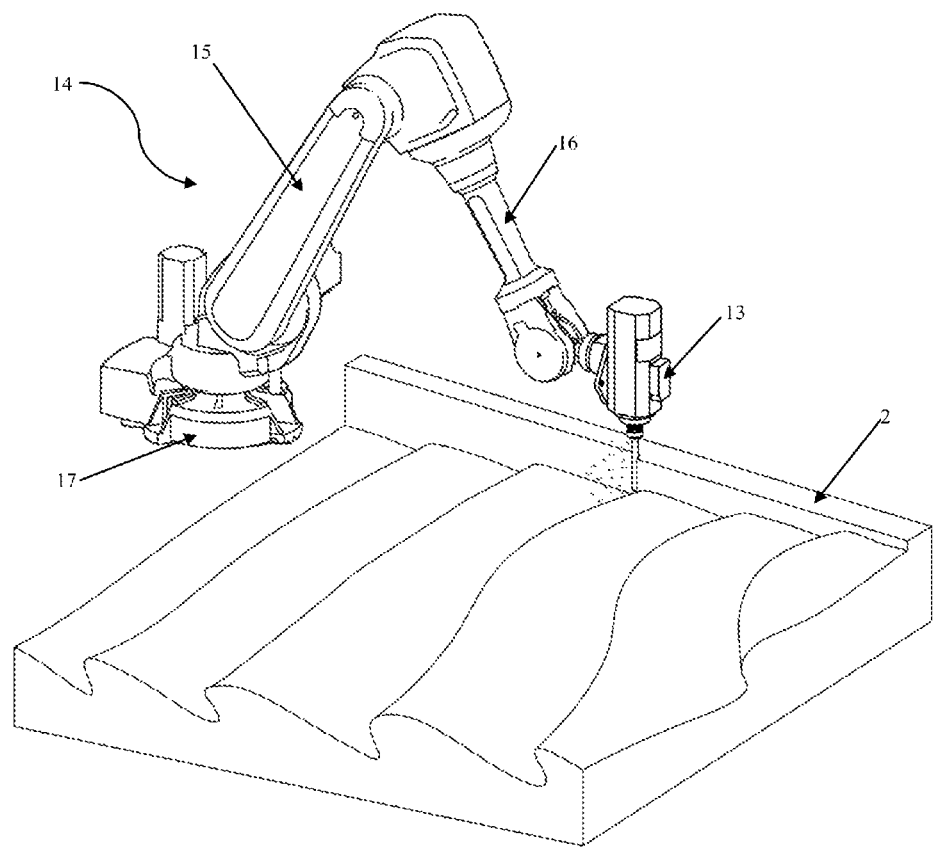
FIG. 1C is a perspective view of computer-controlled robot arm connected to the milling spindle.

FIG. 1C shows an alternative aspect of the apparatus 1 having a robotic arm 14 rotatably secured to a carriage (not shown). The carriage is moveable along a track (not shown) fixed to a surface of the build volume. The robotic arm 14 has a plurality of arm sections 15, 16 and 17 extending from the carriage, the first arm section 17 being rotatably secured to the carriage and each other arm section 15, 16 being rotatably connected to each other around at least one axis. The distal arm section 16 from the carriage is rotatably connectable to the material deposition head 7 (not shown), or the milling spindle 13. The robotic arm 14 is rotatable around at least five axes of rotation allowing the milling spindle 13 (or the deposition head 7) to be moved freely within the build volume and deposit or mill formwork material precisely.

Figure 1D:
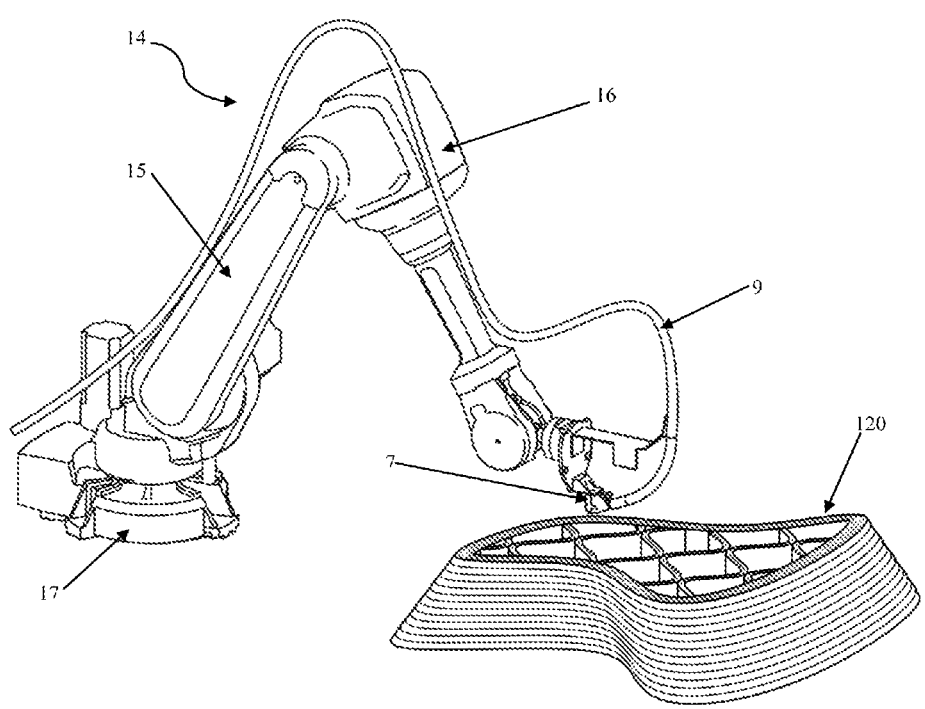
FIG. 1D is a perspective view of the computer-controlled robot arm connected to a material deposition head.

In FIG. 1D, the robotic arm 14 illustrated in FIG. 1C is connected to the material deposition head 7 and selectively depositing portions of formwork material to fabricate an alternative formwork 120. The apparatus 1 is configured to automatically interchange between the material deposition head 7 and milling head 13 responsive to computer instructions. Other heads may also be interchanged by the apparatus 1, such as a robotic gripper (not shown), to grip and move items, or a spray gun (not shown), to selectively spray fluid. For particularly large-scale applications, multiple robotic arms 14 are provided which move along one or more tracks, allowing simultaneous deposition and/or milling of formwork material in different areas of the build volume.

Referring to FIGS. 1C and 1D, the distal arm section 16 of the robotic arm 14 may additionally be equipped with a spray nozzle (not illustrated) for selectively applying a liquid, such as a retarder, an acid, a pigment, paint, or masking material to the formwork 2. As before, the movement of the robotic arm 14, and the application of the liquid to the formwork 2, are computer controlled. Typically the sprayed material is selectively applied to form an image or functional configuration. Materials such as acid and retarder may be applied in varying concentrations, thereby varying the degree to which building material in contact with the formwork 2 is acid etched and/or the depth to which the curing of the building material is retarded. When a retarder is applied to the formwork 2, after curing the constriction element and removing the formwork 2, uncured building material which has been in contact with the retarder is removed from the construction element, for example, by mechanical means such as pressurised water, thereby revealing the image or functional feature applied to the formwork and transferred to the construction element.

Figure 2:
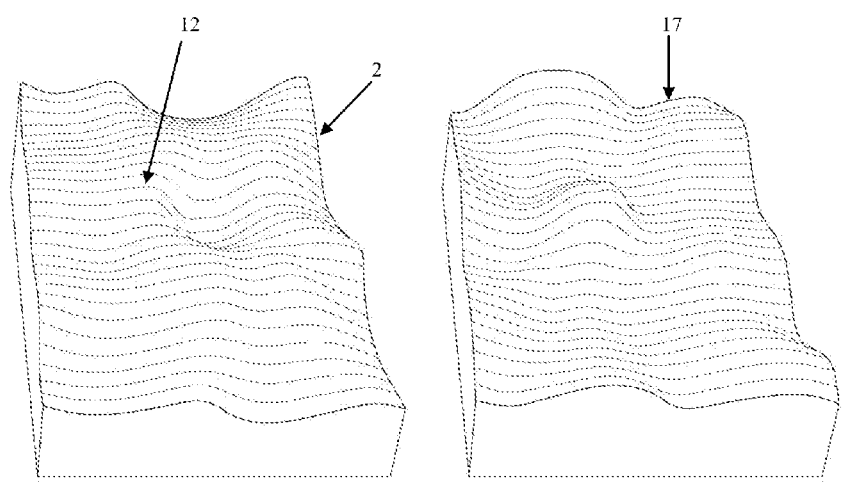
FIG. 2 is a perspective view of a formwork and a cast construction element.

FIG. 2 shows the formwork 2 after fabrication by the apparatus 1, having an undulating casting surface 12. A construction element 17 is positioned next to the formwork 2 which has been cast in contact with the formwork 2, resulting in a surface having complementary geometry to the casting surface 2. The construction element 17 was cast by: fabricating the formwork 2 within the build volume of the apparatus 1; affixing shutters (not shown) to each side of the formwork 2, thereby creating a cavity between the shutters and the casting surface 12 of the formwork 2; pouring substantially liquid building material into the cavity; curing the building material in contact with the shutters and the formwork 2; and disassembling the shutters from the formwork 2 and removing the formwork 2 from the cast construction element 17. Alternatively, the formwork 2 is fabricated with extended sidewalls, eliminating the need for shutters.

Figure 3:
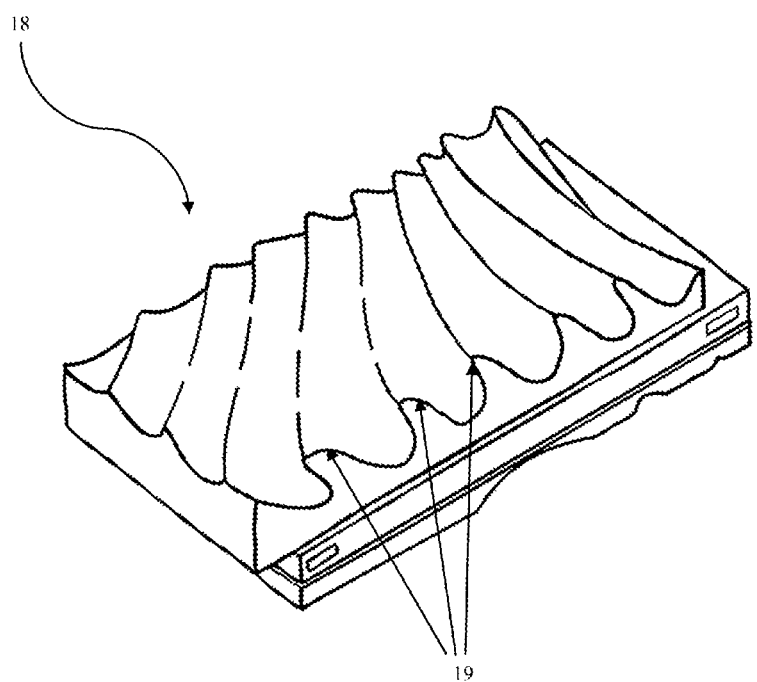
FIG. 3 is a perspective view of an alternative cast construction element.

In FIG. 3, an alternative, construction element 18 is shown. The construction element 18 has been cast according to the method steps described above. The construction element 18 has a number of 'over-hanging' (otherwise known as 'undercut') surfaces 19, which create recesses adjacent to the undercut surfaces 19 which prevent a formwork (not shown) from being drawn linearly away from the construction element 18 once the building material has cured, consequently engaging the formwork with the construction element 18. Accordingly, the engaged formwork and construction element 18 were heated above the melting temperature of the formwork material, thereby melting the formwork and removing it from the construction element 18. The formwork material was collected and recirculated to the formwork material reservoir, where the material may be reused to fabricate another formwork by the apparatus 1.

In general, when removing formworks from construction elements it is preferable to heat both within the build volume of the apparatus 1 to melt the formwork, the build volume being temperature controlled. The formwork material is then collected by a drainage system, processed (if necessary) and recirculated to the reservoir. Processing of formwork material may include filtration to remove debris and chemical treatment to optimise the composition of the material.

Figure 4:
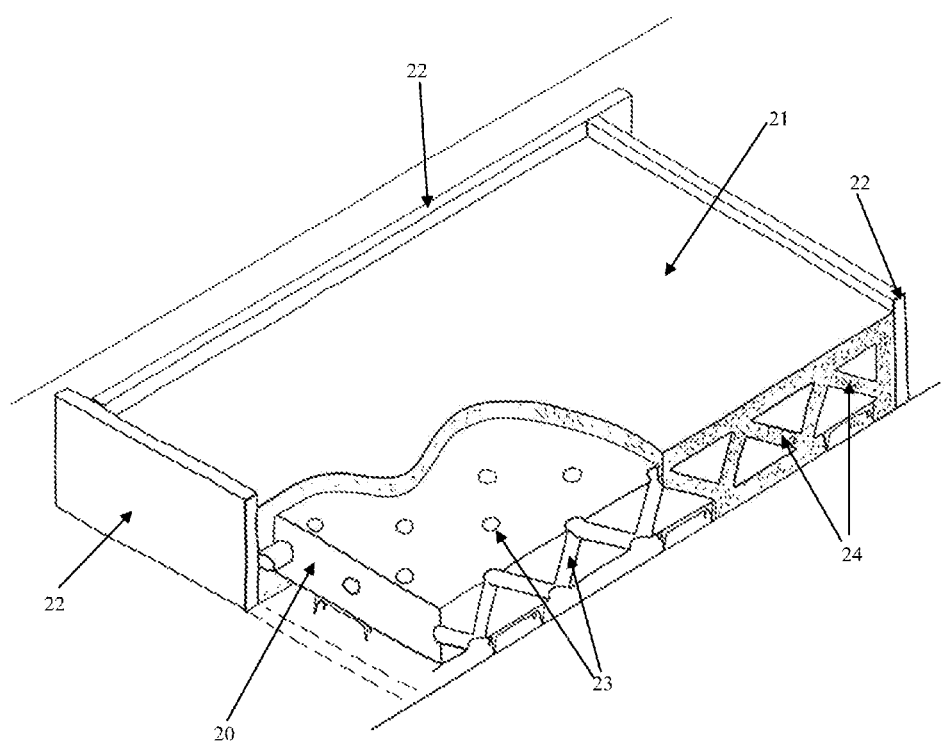
FIG. 4 is a partial section view of an alternative formwork and cast construction element.

FIG. 4 is a partially sectioned view of a core 20, fabricated by the apparatus 1 according to the method described above, and further alternative cast construction element 21 engaged with the core 20. A plurality of shutters 22 are fixed within the build volume and spaced apart from the core 2, forming a cavity around the core 20 into which building material is poured and set to form the construction element 21. The core 20 has a plurality of boreholes 23 into which the building material penetrates. After the building material is cured, the core 20 and construction element 21 are heated above the melting temperature of the core 20 material, melting the core 20 and draining the core material from the construction element 21. Alternatively, if the core 20 is formed from a dissolvable or soluble material, it is dissolved using a liquid, such as a chemical solution. This allows the construction element 21 to be cast having a complex, hollow internal structure, in this case having a plurality of reinforcement braces 24 corresponding with the boreholes 23, efficiently and sustainably, as the core 20 may be removed from the construction element 22 rapidly, without creating waste formwork material. This is particularly advantageous with when casting specific design or engineering features such as internal plenum structures, ventilation shafts, conduits and chilled beams. Alternatively, at least a portion of the core 20 may be left within the cast element 21 to provide functional requirement, such as a heat exchange (by acting as a phase change material), insulation or structural reinforcement.

Figure 5:
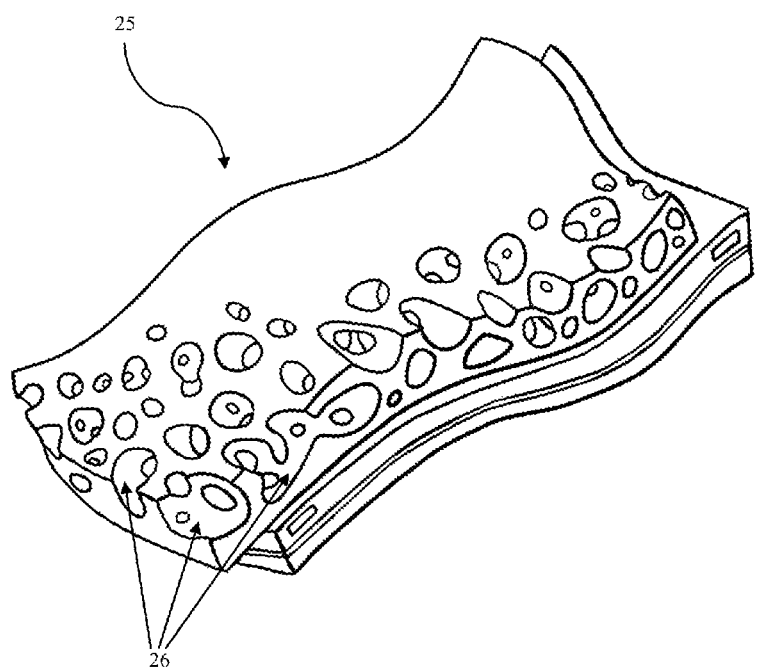
FIG. 5 is a perspective view of a further alternative cast construction element.

FIG. 5 shows an alternative cast construction element 25, formed using an alternative mould and core (not shown). In this case, after the mould and core is melted and removed from the cast element 24, an array of decorative and/or functional cavities 26 are revealed.

Figure 6:
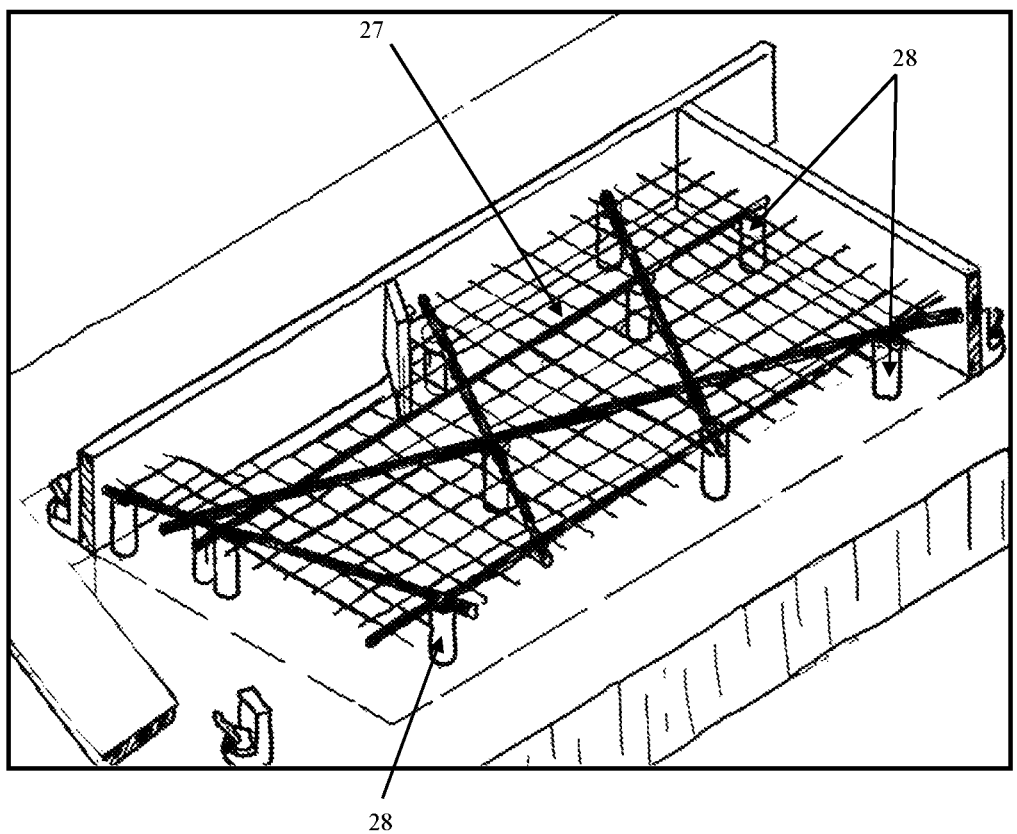
FIG. 6 is a perspective view of a reinforcement frame assembled within a build volume.

In FIG. 6, an optional, additional step of the casting method is illustrated, in which a reinforcement structure 27 is assembled within the build volume, prior to building material being poured. This may involve fabricating support formworks 28 by the apparatus 1, in specific locations, which the reinforcement structure 27 is assembled on, supporting the reinforcement structure 27 where necessary. The reinforcement structure 27 may be assembled by the apparatus 1, or an alternative apparatus, responsive to computer instructions. The support formworks 28 may also be formed as part of another, complex geometry formwork (not shown), such as a three-dimensionally curved structure, to support a complementary, complex geometry reinforcement structure (not shown). The reinforcement structure 27 may include functional components such as conduits (for wiring, plumbing, heating or air handling), insulation or acoustic treatment components.

Figure 7A:
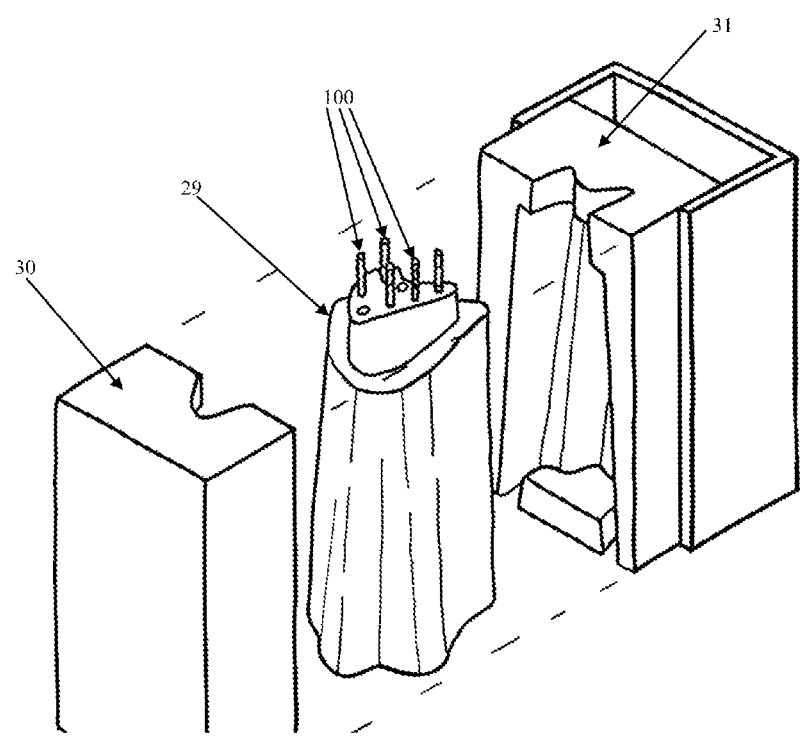
FIG. 7A is an exploded view of a further alternative formwork and cast construction element.

In FIG. 7A a further alternative construction element 29 is shown, formed as a column. As described above, two alternative formworks 30, 31 are fabricated by the apparatus 1. The formworks 30, 31 are joined together forming a cavity therebetween. A reinforcement structure 100 is placed within the cavity, being a plurality of rods. Building material is poured into the cavity and cured in contact with the formworks 30, 31 and reinforcement structure 100, thereby forming the construction element 29 having a corresponding geometry to the cavity and having an integral reinforcement structure 100.

Figure 7B:
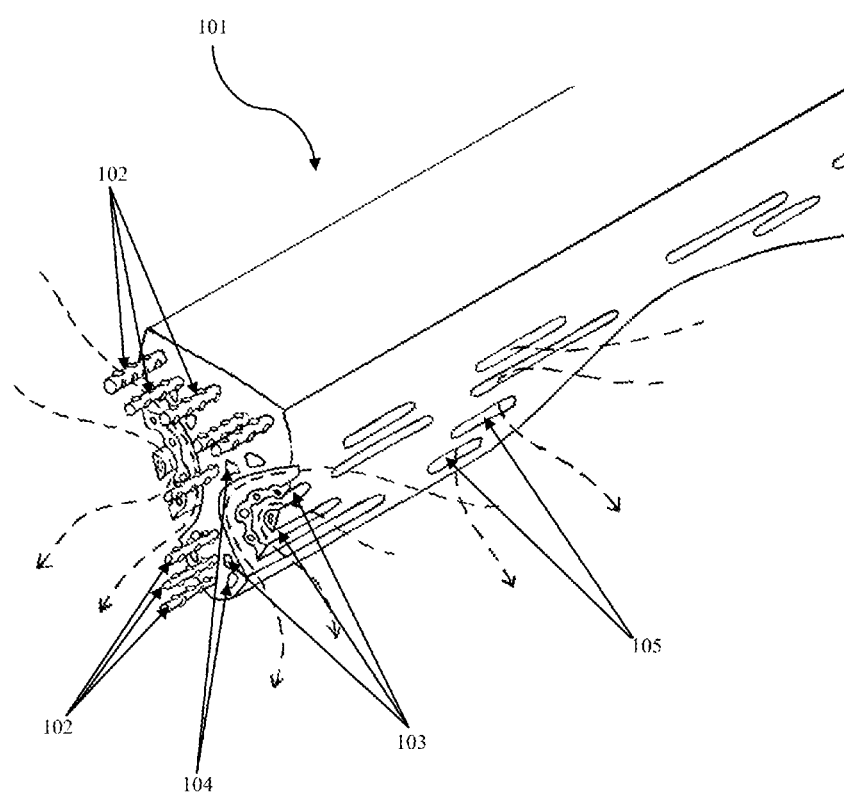
FIG. 7B is a detailed view of a further alternative cast construction element.

FIG. 7B shows a further alternative construction element 101, configured as a 'chilled beam', cast using a formwork (not shown) fabricated by the apparatus 1 as described above. The construction element 101 has a plurality of integral reinforcement bars 102, to increase the strength of the element 101, and a plurality of conduits 103, to allow a fluid, such as air and/or water, to pass through the construction element 101 and regulate the temperature of the construction element. In particular, the conduits 103 are preferably configured to have cooled/heated water flowing through inner conduits 104 and air passing through outer conduits 105, thereby regulating the temperature of the environment surrounding the construction element 101.

Figure 8A:
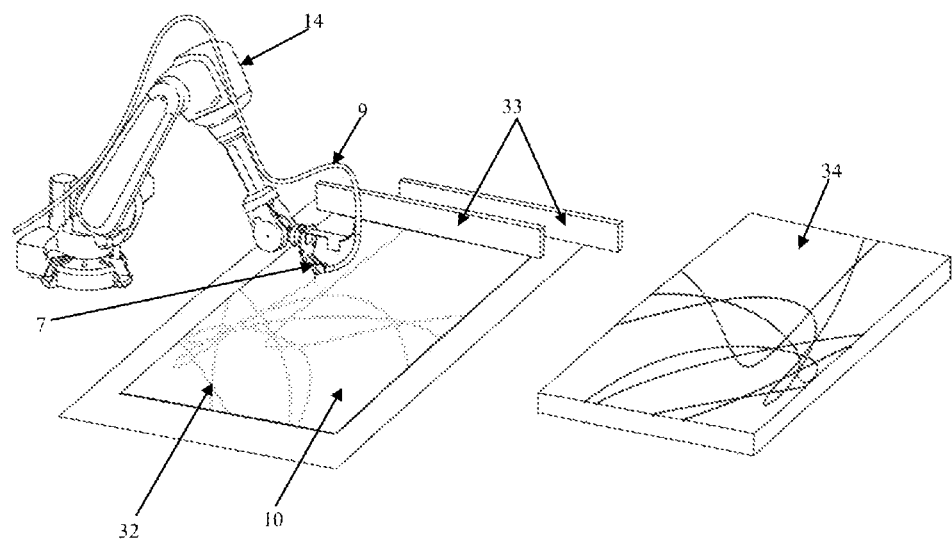
FIGS. 8A and 8B are perspective views of further alternative formworks and corresponding respective cast construction elements.

FIG. 8A shows the robotic arm 14 connected to the material deposition head 7 fabricating an alternative formwork 32 on the substrate 10. The formwork 32 is an extruded two-dimensional illustration, formed from curved ribs extending from the substrate 10. When the shutters 33 are affixed to each side of the substrate 10 forming a volume between each shutter 33, the substrate 10 and the formwork 32, building material is poured into the volume and cured, forming a construction element 34. A previously cast construction element 34, configured as a decorative panel with the extruded illustration embossed into a surface, is positioned adjacent to the substrate 10.

Figure 8B:
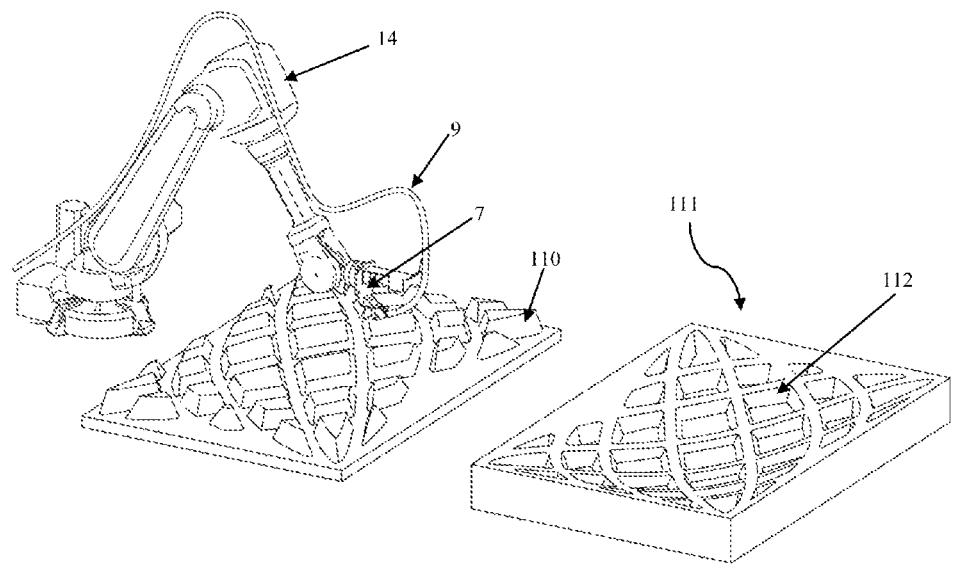

FIG. 8B shows an alternative arrangement of the scenario described with respect to FIG. 8A, showing the robotic arm 14 connected to the material deposition head 7 fabricating an alternative formwork 110. An alternative construction element 111 cast using the formwork 110 is positioned next to the formwork 110. The cast construction element 111 has a corresponding geometry to the formwork 110, thereby forming a 'cofferred' floor slab having a substantially hollow structure reinforced by a plurality of ribs 112.

Figure 9:
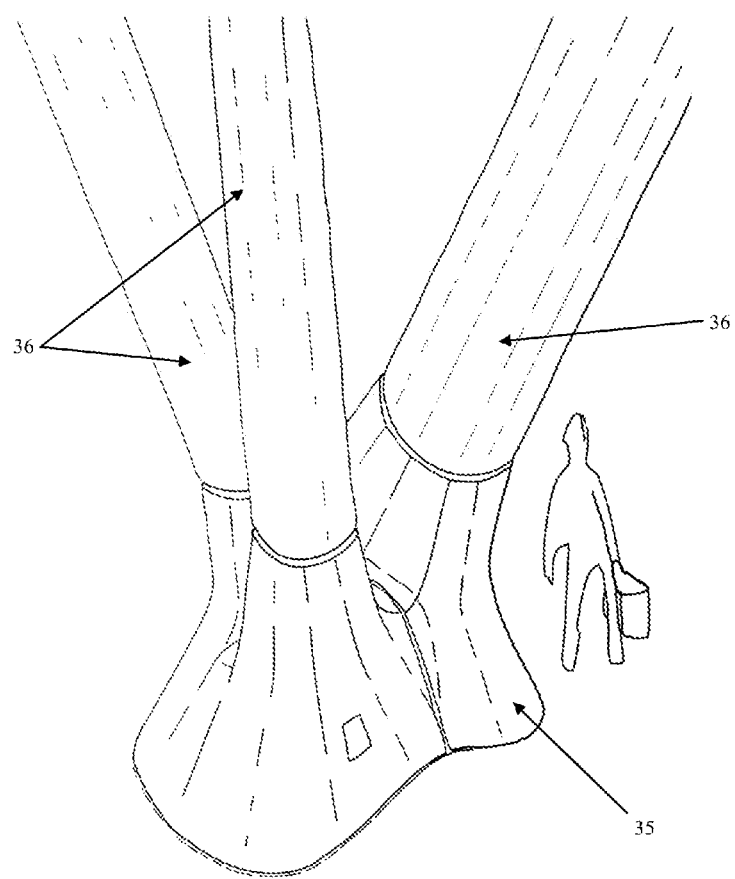
FIG. 9 is a perspective view of an alternative cast construction element secured to a plurality of columns.

FIG. 9 shows a further alternative, large-scale construction element 35, cast using the method described above. The construction element 35 is installed as part of a complex column node assembly, joining a plurality of columns 36. The construction element 35 is cast as a single part using one or more formworks fabricated by the apparatus 1, to form a homogenous, strong structure to support the substantial loads exerted by the columns 36.

Figure 10:
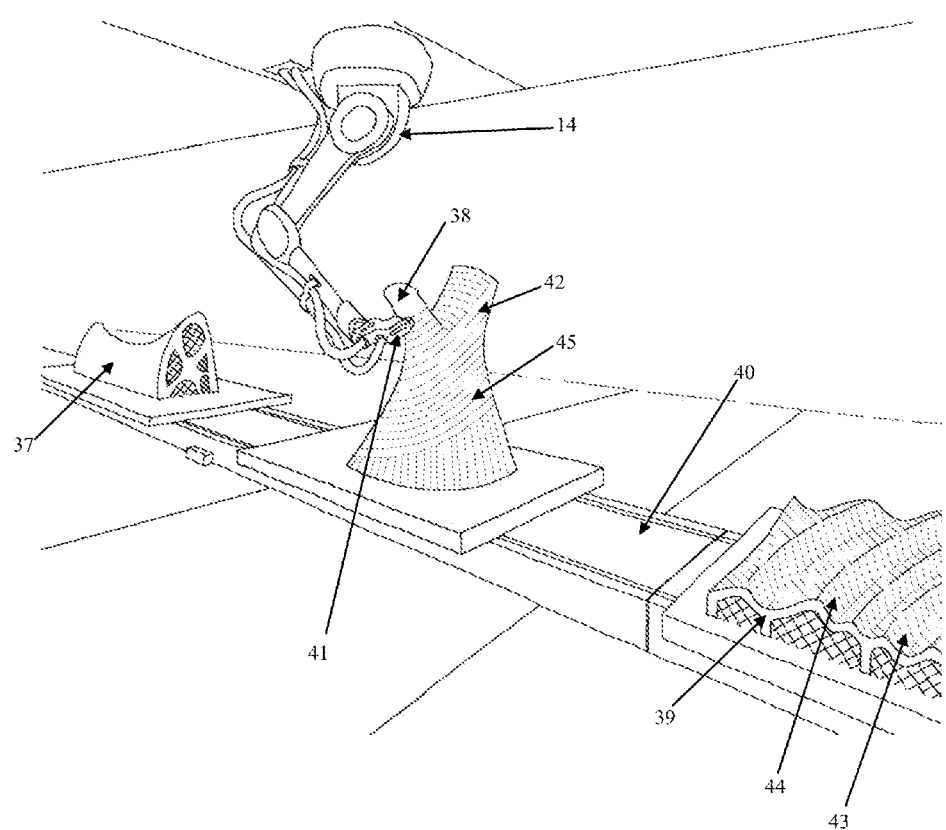
FIG. 10 is a perspective view of an apparatus applying composite material to different formworks.

In FIG. 10, a plurality of alternative formworks 37, 38, 39 are shown on a conveyor 40, each fabricated by the apparatus 1 as described above. The robotic arm 14 is positioned above the conveyor 40, rotatably connected to a composite lay-up head 41. Responsive to computer instructions relating to the geometry of the formwork 38 proximal to the robotic arm 14 on the conveyor 40, the robotic arm 14 moves the composite lay-up head 41, selectively applying composite material 42 to the formwork 38 in specific locations. The composite lay-up head 41 is supplied by one or more spindles of composite matting or tape, and wraps the formwork 38 with a continuous stream of composite material 42 or applies sections of composite material 42. Alternatively, the composite lay-up head 41 includes a nozzle (not shown) in fluid communication with one or more composite material reservoirs (not shown) and, responsive to computer instructions, selectively sprays one or more layers of one or more composite materials in specific locations on the formwork 38. Also, composite material may be applied to a formwork manually, for example, where the geometry of the formwork is particularly complex and inaccessible by the robotic arm 14.

Following (or during) the application of composite material by the composite lay-up head 41 to the formwork 38 the composite material 42 is at least partially cured in contact with the formwork 38 to form one or more composite material elements. The formwork 38 and respective composite material elements may then be used in a number of ways during casting of a construction element.

For example, the formwork 39 has composite material applied to and cured in contact with a casting surface 43 to form a homogenous composite material skin 44 corresponding with the casting surface 43. The formwork 39 and composite skin 44 are then at least partially covered by a building material and the building material cured, thereby forming a construction element (not shown). The building material cures in contact with the composite skin 44, forming a bond between the building material and the composite skin 44. The formwork 39 is then removed from the construction element, exposing the composite skin 44 secured to a corresponding portion of the construction element. This is particularly applicable where it is useful to coat one or more portions of a potentially complex, internal structure of a construction element with composite material, to benefit from the functional or aesthetic properties of the composite material.

Alternatively, for example, after curing composite material in contact with the formwork 38 to form a composite material shell 45, the formwork 38 is removed from the composite material shell 45. The composite material shell 45 is then at least partially filled with a building material, and the building material cured, thereby forming an alternative construction element (not shown), having an integral composite material shell. This is particularly applicable where it is useful to coat an external region of a construction element with composite material, or form a continuous composite shell around a construction element.

Figure 11:
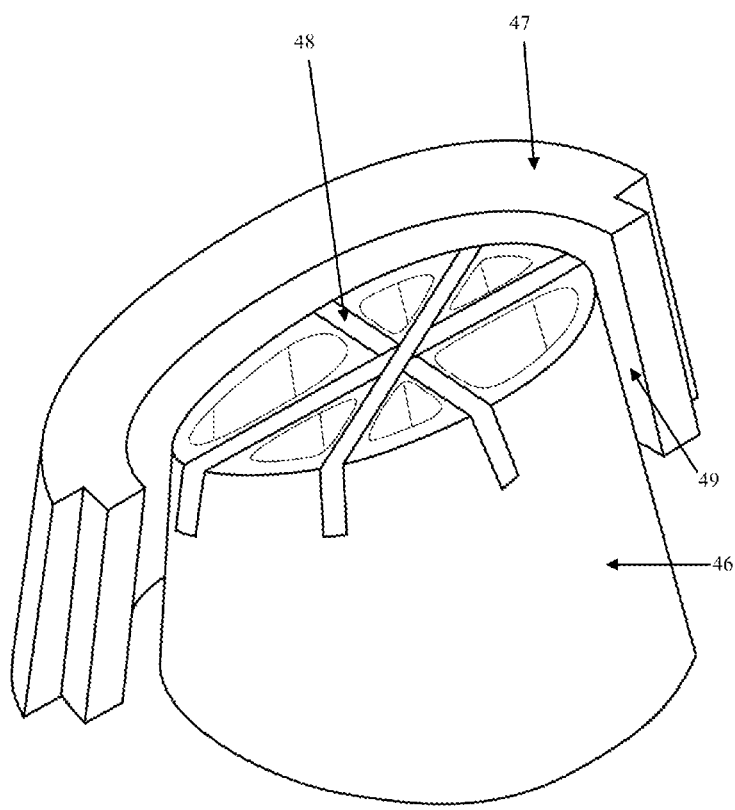
FIG. 11 is a perspective view of two further alternative formworks, one formwork having portions of composite material secured thereto.

In FIG. 11, two alternative formworks 46, 47, are shown, both formworks 46, 47 fabricated by the apparatus 1 as described above, the second formwork 47 shown in partial section. The first formwork 46 has portions of composite material 48 applied across a top surface and sidewalls. The second formwork 47 is spaced apart from the first formwork 46 providing a cavity 49 between the first formwork 46 and second formwork 47. Building material is poured into the cavity 49 and cured in contact with both formworks 46, 47 and the portions of composite material 48, forming a construction element (not shown). Both formworks 46, 47 are then removed from the construction element, revealing the construction element having a corresponding geometry to the cavity 49 and having the composite elements 48 integrally joined to the construction element across a central void, providing a reinforcement structure.

Figure 12:
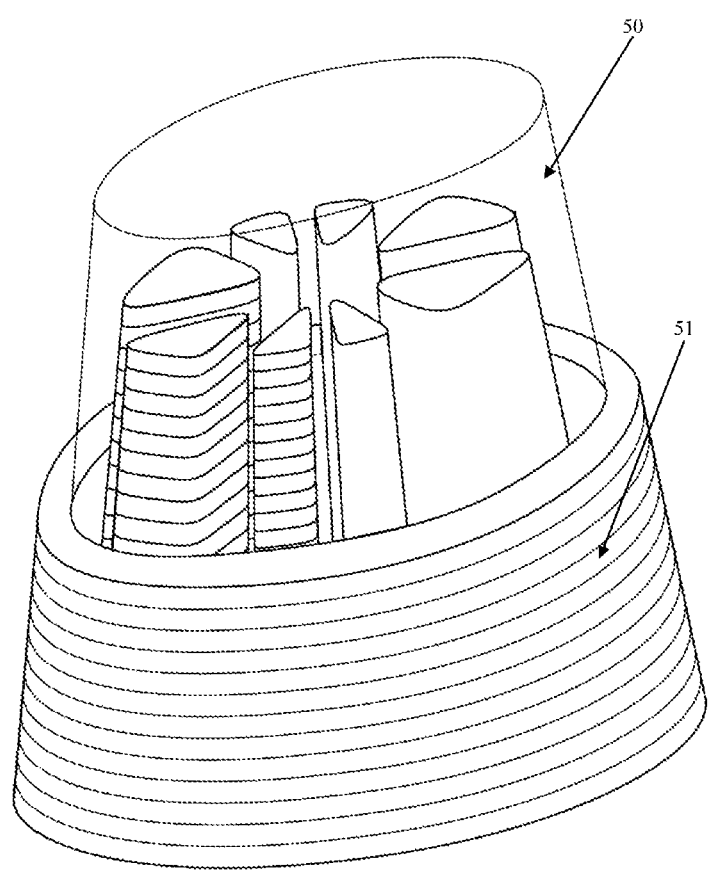
FIG. 12 is a perspective view of a further alternative formwork covered with a composite material and joined to a further alternative cast construction element.

In FIG. 12, a further alternative construction element 50 is shown having an alternative composite material structure 51 secured within the construction element 50. The composite material structure 51 was formed by applying composite material to a corresponding first formwork (not shown) fabricated by the apparatus 1, and at least partially curing the composite material. A second formwork (not shown) was then fabricated by the apparatus 1 in contact with the composite material structure 51, to create a cavity. Building material was poured into the cavity and cured. The first and second formworks were then removed, exposing a column-like construction element 50 having a composite material base 51 extending within the construction element 50, providing a complex, composite skinned internal structure.

Optionally, the composite material structure 51 may also be filled with a second building material and the second building material cured, to form a second construction element enclosed within the composite material structure 51. The second building material may be specified to be the same as or different to the building material used to cast the column-like construction element 50, therefore providing different functional or aesthetic properties. For example, the column-like construction element 50 may be formed from concrete, providing compressive and tensile strength, whereas the second construction element is formed from a foamed polymer, to provide insulation.

Figure 13A:
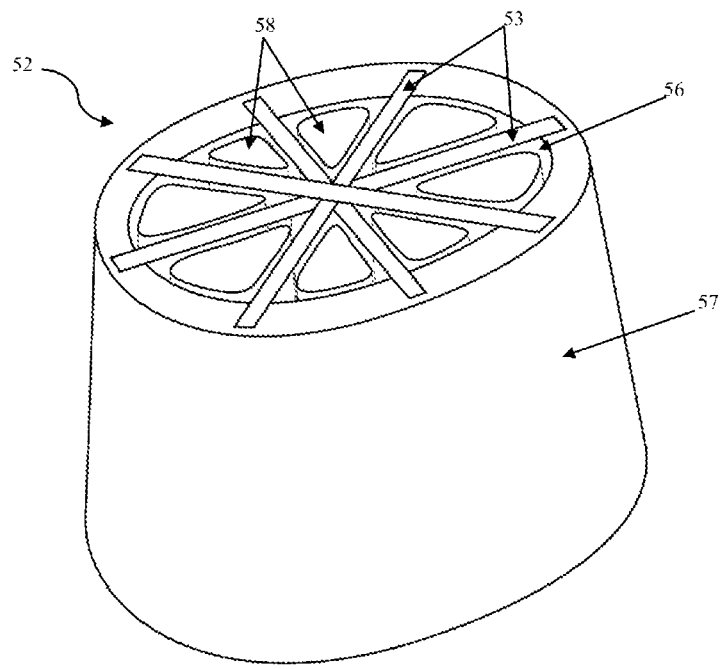
FIG. 13A is a perspective view a further alternative formwork with portions of composite material secured thereto.
Figure 13B:
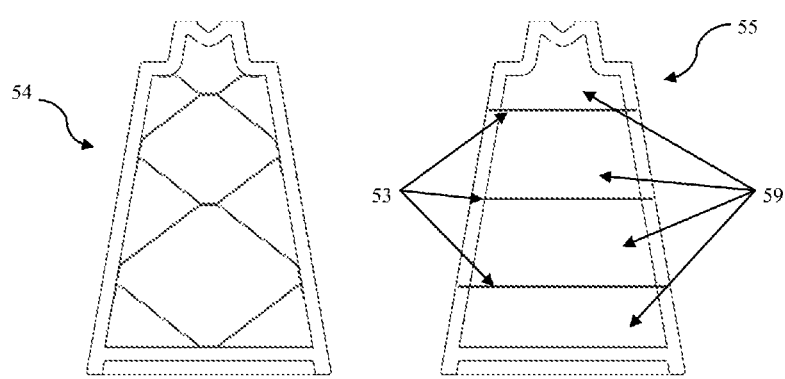
FIG. 13B is a side view of two alternative cast construction elements having integral portions of composite material.

FIG. 13A shows a further alternative formwork 52, fabricated by the apparatus 1 as described above, with composite material webs 53 secured across a top surface. FIG. 13B shows two alternative construction elements 54, 55 comprising composite material layers sandwiched between solidified building material layers. The construction elements 54, 55 were cast using the formwork 52, or a similar formwork.

For example, formwork 52 defines a cavity 56 between an outer formwork portion 57 and inner formwork portions 58. Building material is poured into the cavity 56 and cured in contact with the formwork portions 57, 58 and composite material webs 53, thereby forming a solid construction element portion 59 having integral composite material webs 53. The process may then be repeated, fabricating additional outer and inner formwork portions (not shown) on a top surface of the outer formwork portion 57 and inner formwork portions 58, securing additional composite material webs 53 and casting an additional construction element portion 59. The repetition of the process thereby produces construction element 55 in a staged process.

Figures 14A, 14B:
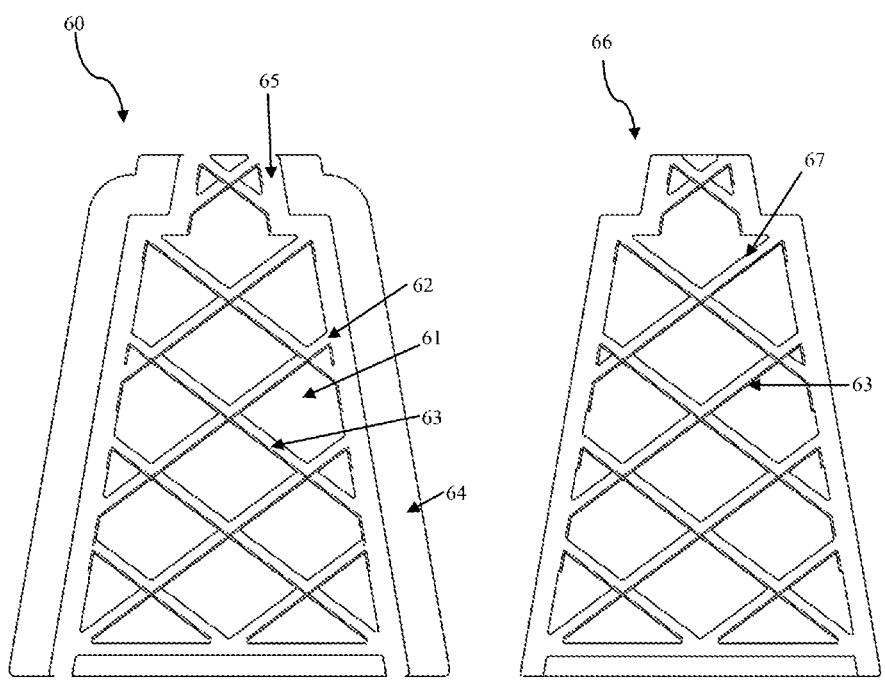
FIGS. 14A and 14B are cross-section views of an alternative formwork having portions of composite material secured thereto and an alternative construction element cast using the formwork.
Figures 15A, 15B:
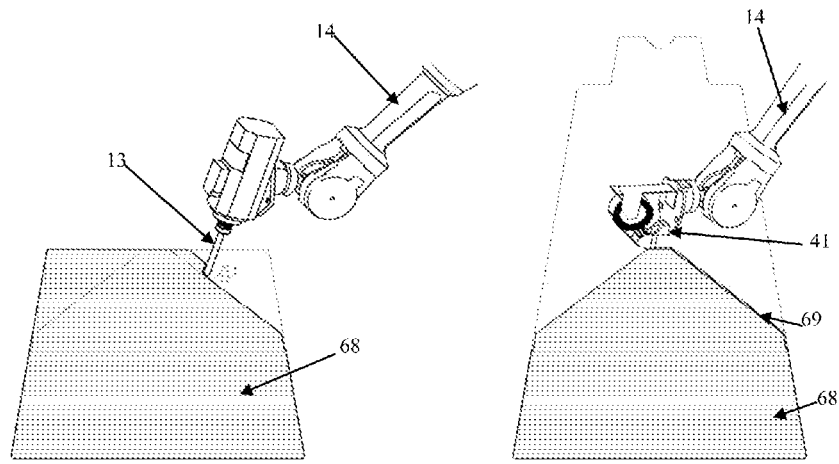
FIGS. 15A-15D illustrate various stages of fabricating a further alternative formwork having multiple integral portions of composite material.
Figure 15C:
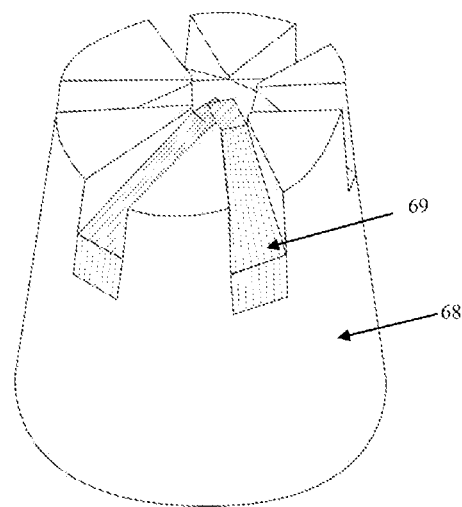
Figure 15D:
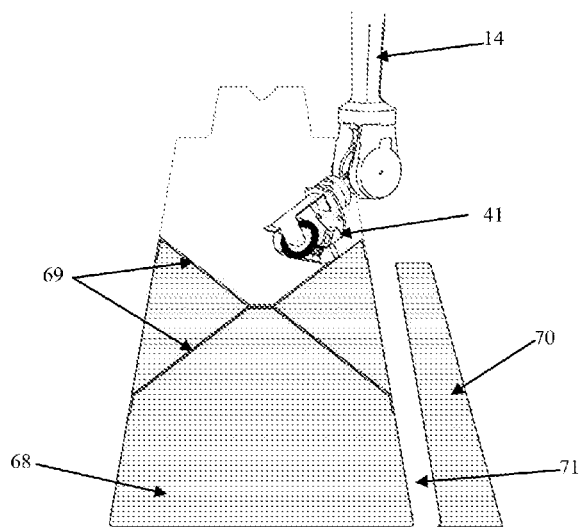
Figure 15E:
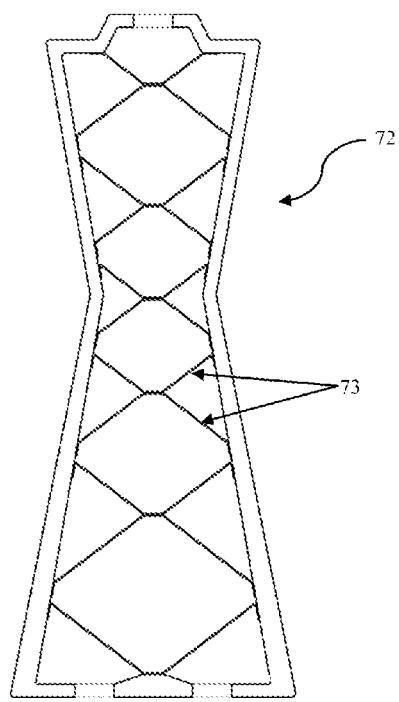
FIG. 15E is a cross-section view of an alternative cast construction element having multiple integral portions of composite material.

FIG. 14A illustrates a cross-section of an alternative formwork 60 fabricated by the apparatus 1 as described above. The formwork 60 comprises an inner portion 61 which has a plurality of linear voids 62. During fabrication by the apparatus 1, composite material 63 is applied to at least some of the surfaces of the linear voids 62, forming composite webs running along the linear voids 62. The formwork also comprises an outer portion 64 having internal surfaces spaced apart from the inner portion 61, forming a cavity 65. During the casting process, building material is poured into the cavity 65, filling the cavity 65 and linear voids 62. The building material is cured, thereby forming a solid construction element 66, as shown in FIG. 14B. The construction element 66 is a substantially hollow structure, having a network of beams 67 spanning its internal volume, each beam 67 having composite material 63 extending along some of its surfaces, providing a composite reinforcement structure. This is particularly useful when producing construction elements which are likely to experience specific and substantial dead or live loading cycles, for example, seismic shocks, as the composite material coated beams 67 increase the strength and stiffness of the construction element 66, without significantly increasing its weight.

In FIGS. 15A-15E, a further alternative formwork 68 is fabricated by the apparatus 1 in stages, by the robotic arm 14 selectively operating the material deposition head 7 and milling spindle 13, responsive to computer instructions. In between each stage of fabrication, the robotic arm 14 operates the composite lay-up head 41 to selectively apply composite material portions 69 to the formwork 68. The repetition of fabricating the formwork 68 and applying composite material 69 to the formwork 68 produces composite material layers 69 embedded within the formwork 68. A second formwork 70 is fabricated or positioned adjacent to the first formwork 68 forming a cavity 71 between the formworks 68, 70. Building material is poured into the cavity 71 and cured, thereby forming a solid construction element 72. The formworks 68, 70 are then removed from the construction element 72 preferably by melting at least the first formwork 68, revealing a hollow interior within the construction element 72 having an integral composite scaffold 73, formed from the composite material portions 69.

It will be apparent that obvious variations or modifications may be made which are in accordance with the spirit of the present invention and which are considered within the scope of the invention.

The invention claimed is:

1. A method for casting building material to form a construction element using a computer-controlled apparatus, the apparatus having a material deposition head in communication with a reservoir of formwork material and being movable within a build volume of greater than 1 m$^3$ responsive to computer instructions, the method comprising the sequential steps of:

(a) receiving, by the apparatus, computer instructions relating to a formwork geometry;

(b) responsive to receiving the computer instructions, moving the material deposition head within the build volume and depositing the formwork material, from the deposition head, in specific locations defined by the computer instructions to progressively build up a formwork corresponding with the formwork geometry, such that the formwork defines a shell at least partially covering a scaffold structure, the scaffold structure comprising a plurality of interconnected braces defining a plurality of voids, and the shell defining a three-dimensional casting surface;

(c) applying one or more portions of composite material to the formwork in specific locations, defined by the computer instructions, to at least partially cover the casting surface;

(d) at least partially covering the casting surface and/or the one or more portions of composite material with the building material;

(e) at least partially curing the building material in contact with the casting surface so that the at least partially cured building material bonds to the one or more portions of the composite material and forms the construction element;

(f) removing at least a portion of the formwork from the construction element; and then (g) collecting the formwork material removed from the construction element and recirculating the removed formwork material to the reservoir to allow the removed formwork material to be re-used, by the computer-controlled apparatus, to fabricate a further formwork.

2. The method for casting building material to form a construction element according to claim 1, wherein the step of removing the at least a portion of the formwork comprises heating the construction element and the at least a portion of the formwork to a temperature above the melting point of the formwork material, thereby melting the at least a portion of the formwork.

3. The method for casting building material to form a construction element according to claim 2, wherein the building material is concrete and the step of heating the construction element and the at least a portion of the formwork to the temperature above the melting point of the formwork material comprises heating the construction element and the at least a portion of the formwork to less than 70° C.

4. The method for casting building material to form a construction element according to claim 2, wherein the formwork material is a wax compound.

5. The method for casting building material to form a construction element according to claim 1, further comprising the step of applying one or more materials to the formwork in specific locations in order to affect a surface finish of the construction element.

6. The method for casting building material to form a construction element according to claim 5, wherein one of more the materials used to affect the surface finish of the construction element comprise at least one of an acid, a pigment, paint, or masking.

7. The method for casting building material to form a construction element according to claim 1, further comprising the steps of:
before pouring the building material, applying a retarder to the formwork in specific locations; and
after the at least a portion of the formwork is removed from the construction element, removing uncured building material from the construction element by mechanical means.

8. The method for casting building material to form a construction element according to claim 1, wherein the apparatus further has a milling head movable within the build volume responsive to computer instructions, and the method further comprises the step of, before pouring the building material, operating the milling head to mill the formwork in specific locations.

9. The method for casting building material to form a construction element according to claim 1, wherein the scaffold structure defines at least one conduit arrange to allow a fluid to pass through the formwork.

10. The method for casting building material to form a construction element according to claim 1, wherein the step of depositing the formwork material to fabricate the formwork further comprises heating or cooling at least a portion of the build volume.

11. The method for casting building material to form a construction element according to claim 1, wherein the step of applying the one or more portions of composite material to the formwork further comprises curing the one or more portions of composite material.

* * * * *